United States Patent
Hirota et al.

(10) Patent No.: US 7,518,890 B2
(45) Date of Patent: Apr. 14, 2009

(54) AC/DC/AC CONVERTER WITH REDUCED INDUCTANCE IN THE DC FILTER CAPACITORS

(75) Inventors: Masayuki Hirota, Narashino (JP); Satoshi Ibori, Yachimata (JP); Tomoya Kamezawa, Narashino (JP); Jiangming Mao, Narashino (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 11/508,198

(22) Filed: Aug. 23, 2006

(65) Prior Publication Data
US 2007/0091652 A1    Apr. 26, 2007

(30) Foreign Application Priority Data
Oct. 24, 2005  (JP)  ............... 2005-307967

(51) Int. Cl.
*H01G 4/228* (2006.01)
(52) U.S. Cl. .............. 363/34; 363/37; 363/45; 361/306.1; 361/329
(58) Field of Classification Search ........... 361/306.1, 361/328, 329, 330; 363/34, 37, 44, 45, 47, 363/48
See application file for complete search history.

(56) References Cited

U.S. PATENT DOCUMENTS

| | | | | |
|---|---|---|---|---|
| 4,568,871 A * | 2/1986 | Bauman | ............... | 323/364 |
| 4,651,266 A * | 3/1987 | Fujioka et al. | ............... | 363/39 |
| 4,967,334 A * | 10/1990 | Cook et al. | ............... | 363/34 |
| 5,315,497 A * | 5/1994 | Severinsky | ............... | 363/34 |
| 5,388,028 A * | 2/1995 | Arbanas | ............... | 361/710 |
| 6,084,785 A * | 7/2000 | Kunisada et al. | ............... | 363/37 |
| 6,151,228 A * | 11/2000 | Miyazaki et al. | ............... | 363/48 |
| 6,288,915 B1 * | 9/2001 | Stemmler et al. | ............... | 363/34 |
| 6,301,130 B1 * | 10/2001 | Aiello et al. | ............... | 363/37 |
| 7,274,576 B1 * | 9/2007 | Zargari et al. | ............... | 363/39 |

FOREIGN PATENT DOCUMENTS

JP     11-089247     3/1999

* cited by examiner

*Primary Examiner*—Jeffrey L Sterrett
(74) *Attorney, Agent, or Firm*—Antonelli, Terry, Stout & Kraus, LLP.

(57) ABSTRACT

A frequency converter in which the inductance is reduced by enlarging the forms of bus bars which connect a P phase, an N phase of an inverter part and a positive electrode or a negative electrode of smoothing capacitors and the form of a wiring bus bar which connects an intermediate layer of capacitors which are connected in series to enlarge areas where they overlap each other, and by making currents flow in the opposite directions to each other.

10 Claims, 8 Drawing Sheets

AC/DC/AC CONVERTER WITH REDUCED INDUCTANCE IN THE DC FILTER CAPACITORS

INCORPORATION BY REFERENCE

The present application claims priority from Japanese application JP2005-307967 filed on Oct. 24, 2005, the content of which is hereby incorporated by reference into this application.

FIELD OF THE INVENTION

The present invention relates to a technique to provide a frequency converter.

BACKGROUND OF THE INVENTION

Regarding the wiring of the inner part of a frequency converter, particularly the wiring connecting a smoothing capacitor and an inverter part, it is known that the inductance has to be reduced to restrain the surge voltage of the inverter part and to protect a semiconductor device.

About this method for reducing the inductance, it is disclosed in Japanese Patent Application Publication No. JP-A-11-89247.

In the JP-A-11-89247, it is described that "It is characterized in that the wiring part (20) of a first, a second and a third DC voltages are constituted as a structure wherein a first, a second and a third planar conductors (201, 202, 203) and a first and a second insulating sheets (204, 205) are alternately laminated. By constituting the laminated structure like this interposing the planar conductors between the insulating sheets, the wiring inductance can be reduced also in an equipment which converts three or more DC voltages to an AC voltage."

SUMMARY OF THE INVENTION

As problems, etc. are described also in the JP-A-11-89247, in the frequency converter, on turning off the device of the inverter part, as the semiconductor device cuts off the energy which has been accumulated so far particularly in the inductance of the wiring connecting the smoothing capacitor and the inverter part, a sharp surge voltage (leap voltage) is generated at both ends of the device as shown in FIG. 1.

A circuit which restrains the surge voltage (leap voltage) by bypassing the cut off energy and protects the device is called a snubber circuit, and it is commonly performed to provide this circuit to restrain this surge voltage (leap voltage) which is generated on turning off the device of the inverter part to protect the semiconductor.

However, to restrain the sharp and large surge voltage (leap voltage), with a RC snubber circuit which has a simple circuit configuration a big capacitor will be needed, also to downsize the capacitor, it will be necessary to provide a charge and discharge RCD snubber circuit or a discharge blocking RCD snubber circuit. In either case, with the circuit provided, the space to install the circuit will be needed and it is necessary to consider the guidance of the wiring, etc. of the snubber circuit.

Also, to prevent this surge voltage (leap voltage), other than restraining it with the snubber circuit, as described in the JP-A-11-89247 it is possible to prevent the surge voltage (leap voltage) from being generated by reducing the inductance of the wiring planar conductor which connects the smoothing capacitor and the inverter part and preventing the energy from being accumulated.

In above-mentioned reducing the inductance of the wiring planar conductor, it is predicted that the degree of its reduction will vary depending on how each wiring planar conductor is provided.

Therefore, it is an object of the present invention to improve the degree of the reduction of the inductance by devising how each wiring planar conductor is provided.

The present invention will achieve the above object as will be described below.

The object is accomplished by enlarging the forms of the wiring planar conductors and enlarging the area in which each of the wiring planar conductors overlaps each other, and making the current which flows in each of the wiring planar conductors (hereinafter it is called a bus bar) to be in the opposite directions to each other, in order to make the inductance of the wiring planar conductor connecting the two serial capacitor terminals and the inverter part smaller than the conventional one.

Also, in the arrangement of the above-mentioned two serial capacitors, each of the positive electrodes and the negative electrodes are arranged so that they are opposite electrodes to each other. More specifically, next to a positive electrode terminal of one capacitor a negative electrode terminal of the other capacitor is located. Also, next to a negative electrode terminal of one capacitor, a positive electrode terminal of the other capacitor is located.

In this way, the opposite electrodes are arranged to be next to each other, an overlapping part with a P phase bus bar connected to the positive electrode terminal and an N phase bus bar connected to the negative electrode terminal is provided, and the space between both phases is made to be a small distance to make them face each other.

Also, an M phase bus bar which connects the positive electrode terminal of one capacitor to the negative electrode terminal of the other capacitor to connect the two capacitors in series is provided with an extension surface which is extended bulging on a plane to overlap the P phase bus bar and the N phase bus bar, in addition to the form to connect the positive electrode terminal and the negative electrode terminal in the shortest distance.

Further, each of the P phase bus bar and the N phase bus bar is provided with an extension surface which is extended bulging to overlap other two bus bars each other.

It is devised to reduce the inductance of each other by the flow of the electric current which flows expanding as though to make a detour on the extension surfaces which are provided on these three bus bars.

Moreover, for the M phase bus bar, each of the P phase bus bar and the N phase bus bar is provided above and below so that it is interposed between them, further the directions of the currents are made to be opposite to each other including the extension surfaces so that the inductance can be reduced.

According to the present invention, it is possible to provide a frequency converter with enhanced reliability than the conventional one. As it is possible to restrain the surge voltage which is generated on turning off the device of the inverter part, it is possible to provide an apparatus with smaller size than the conventional one and to provide a good quality product by simplifying and downsizing the snubber circuit of the frequency converter and reducing the generation of heat of the inverter part.

Other objects, features and advantages of the invention will become apparent from the following description of the embodiments of the invention taken in conjunction with the accompanying drawings.

DESCRIPTION OF THE EMBODIMENTS

An embodiment of a frequency converter configured using the present invention will be explained below using the drawings.

Figure 4:
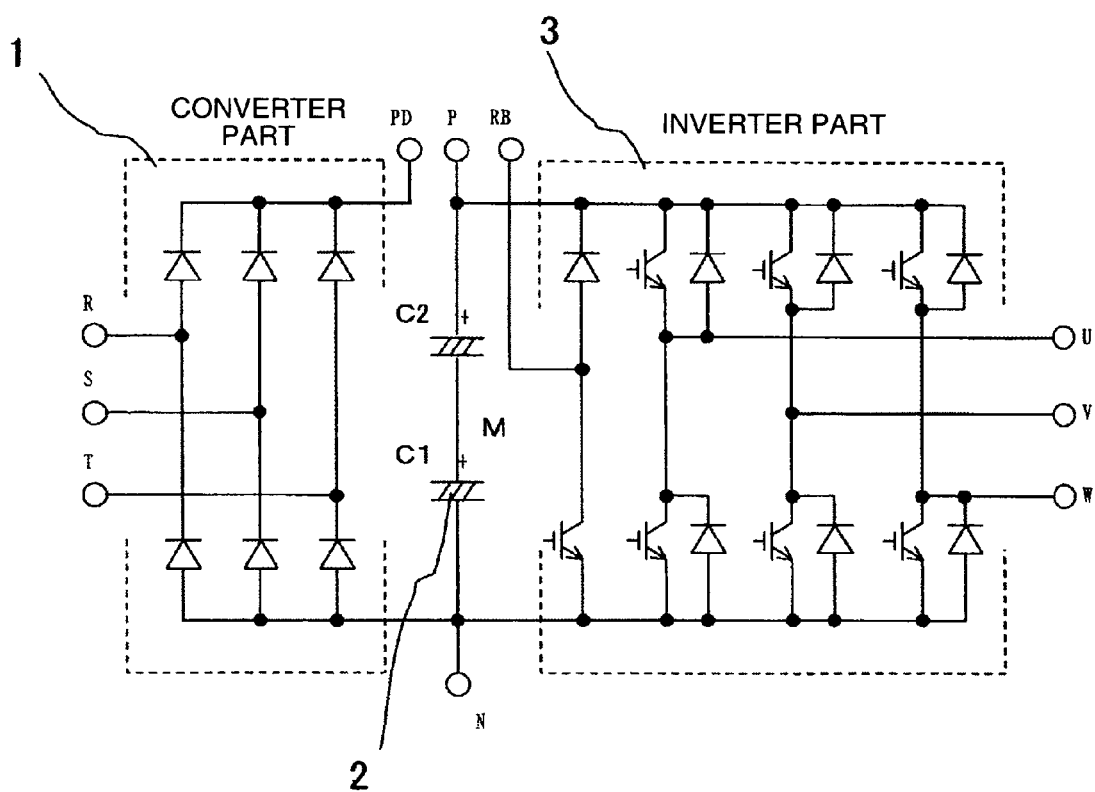
FIG. 4 is an example of a circuit diagram of a frequency converter.

FIG. 4 is an embodiment of a circuit diagram of a frequency converter. In this figure, an AC power from a power source is input to a smoothing capacitor 2 which makes it smooth after being converted to a DC power at a conversion (converter) part 1, and an output from the smoothing capacitor 2 is converted to an AC power at an inversion (inverter) part 3 by the control by a control signal from a control part (not shown).

For the capacitor 2 used for a smoothing circuit of the frequency converter, for example, an aluminum electrolytic capacitor is used. For example, in the frequency converter for 400V input voltage, the working voltage of a typical aluminum electrolytic capacitor is 400V. For this reason, when the voltage of the input power source is 400V, because of the working voltage of the smoothing capacitor 2, it is common to use two smoothing capacitors with resisting voltage of 800V (400V+400V) by using two smoothing capacitors 2 and connecting the "+" (positive electrode) terminal of a smoothing capacitor C1 and the "−" (negative electrode) terminal of a smoothing capacitor C2 to connect the two capacitors in series. A phase where the positive electrode terminal of the smoothing capacitor C1 and the negative electrode terminal of the smoothing capacitor C2 are connected in this case is referred to as an M phase.

About the embodiment of the serial connection of the smoothing capacitor C1 and the smoothing capacitor C2 in FIG. 4, it will be explained about how the wiring planar conductors (hereinafter it is called a bus bar) are provided and how the electric currents flow in this case using FIG. 2 and FIG. 3.

Figure 1:
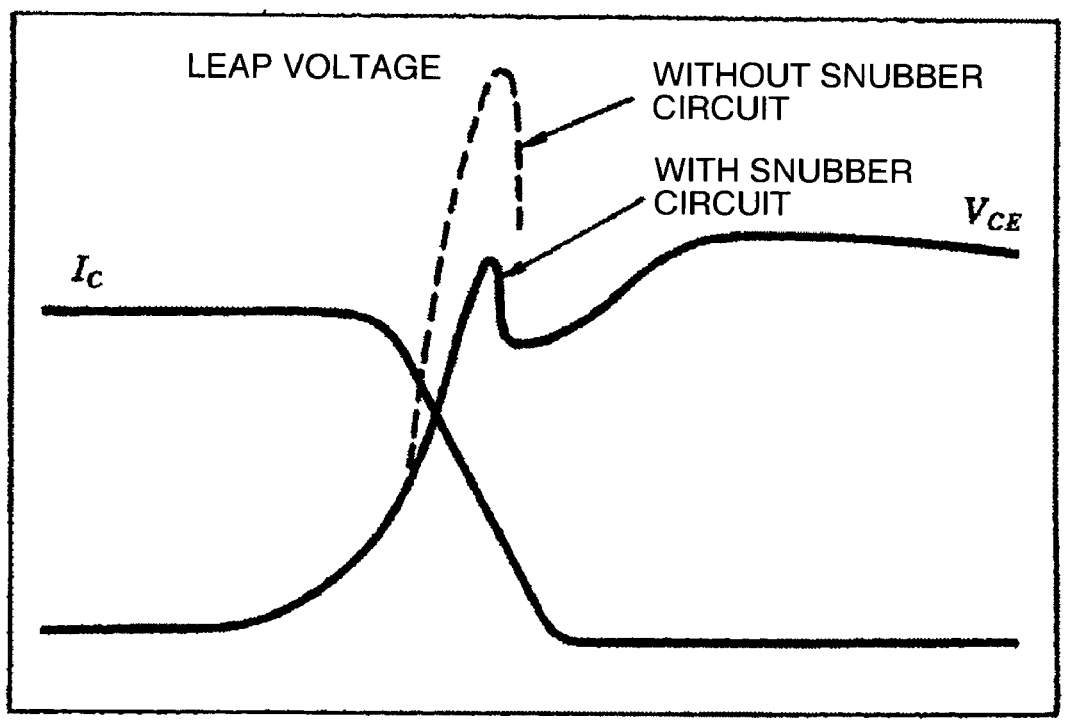
FIG. 1 is an example of the leap voltage on turn-off.
Figure 2:
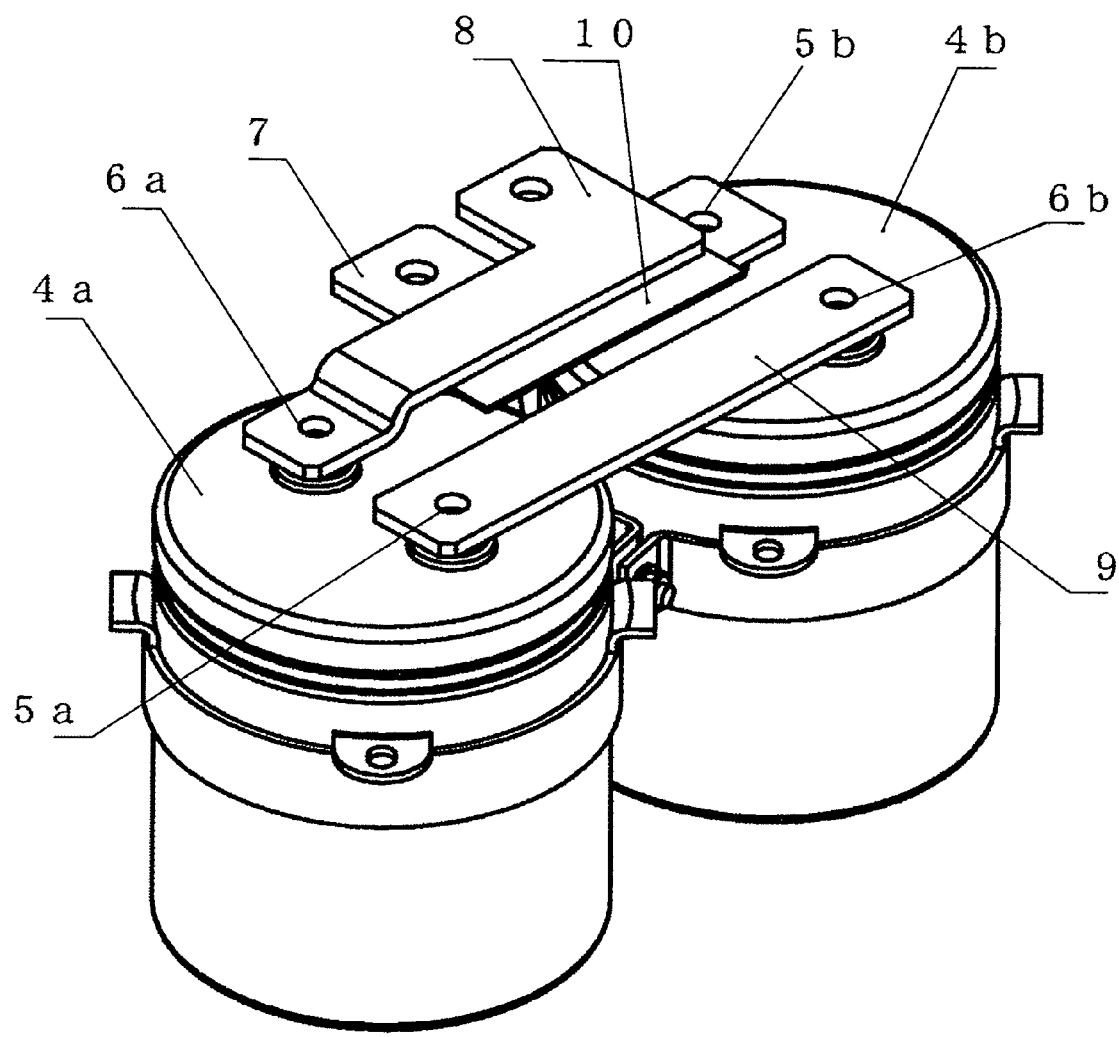
FIG. 2 is a preferred embodiment of the present invention.

In FIG. 2, smoothing capacitors 4a, 4b are provided with positive electrode terminals 5a, 5b and negative electrode terminals 6a, 6b. On providing these, the positive electrodes and the negative electrodes of the two smoothing capacitors are arranged to be the opposite electrodes to each other. More specifically, next to the positive electrode terminal 5a of the smoothing capacitor 4a the negative electrode terminal 6b of the smoothing capacitor 4b is located. Also, next to the negative electrode terminal 6a of the smoothing capacitor 4a, the positive electrode terminal 5b of the smoothing capacitor 4b is located. Here, at this work of arranging the positive electrodes and the negative electrodes of the smoothing capacitors 4a, 4b to make them the opposite electrodes to each other, it is necessary to avoid an arrangement error. In FIG. 2, a mounting component connecting the smoothing capacitors 4a, 4b is shown, and by the form of this mounting component, the location of mounting hole, etc. provided in the component it is possible to avoid the above-mentioned error of the arrangement work.

And there are a P phase bus bar 7 which is connected to the positive electrode terminal 5b and a P phase on the positive electrode side of the inverter part, and an N phase bus bar 8 which is connected to the negative electrode terminal 6a and an N phase on the negative electrode side of the inverter part.

Also, in order to connect the smoothing capacitor 4a and the smoothing capacitor 4b in series, an M phase bus bar 9 is provided to connect the positive electrode terminal 5a of the smoothing capacitor 4a and the negative electrode terminal 6b of the smoothing capacitor 4b. Further, an insulator 10 is also provided to insulate the P phase bus bar 7 and the N phase bus bar 8.

Figure 3:
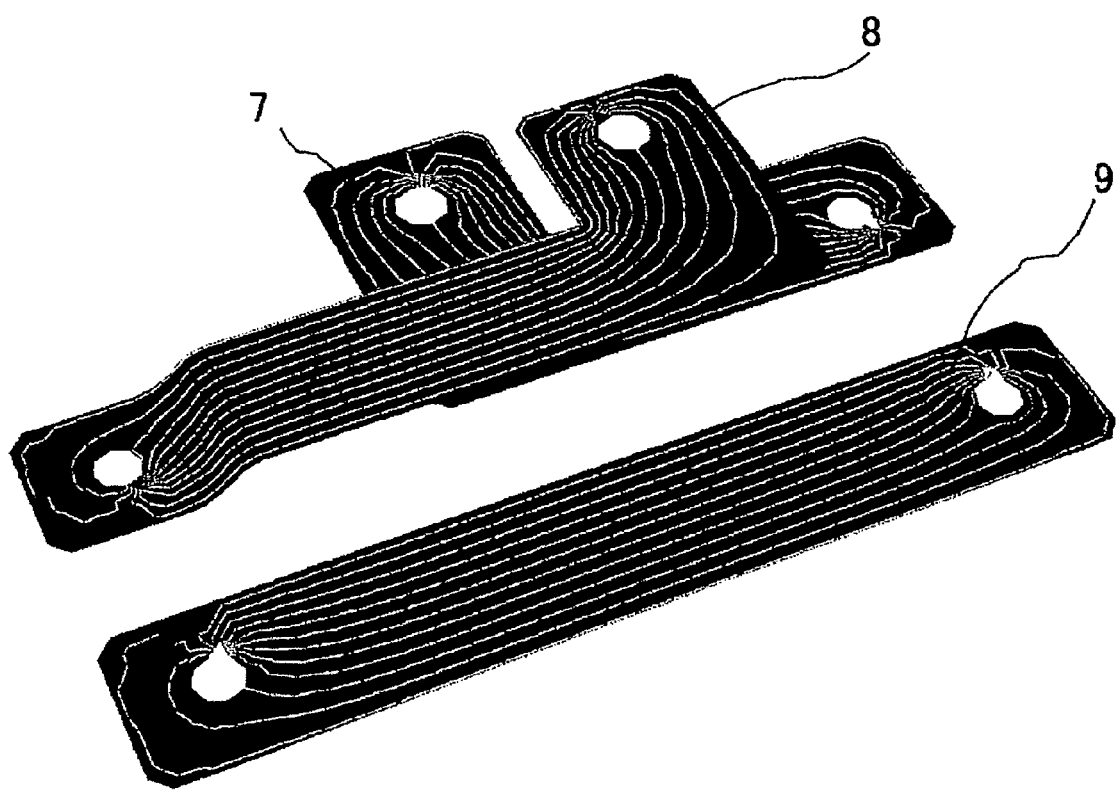
FIG. 3 is an example of a result of the simulation of the embodiment of the present invention.

And FIG. 3 is a current streamline of a result of the simulation of the flows of the currents which flow on the surfaces of the bus bars when they are arranged in this manner. In FIG. 3 it is shown that the currents flow on the surfaces of the bus bars uniformly.

As it is described above, in FIG. 2 and FIG. 3, it is devised that the positive electrodes and the negative electrodes of the two smoothing capacitors are arranged to be opposite electrodes to each other. As the opposite electrodes are arranged to be next to each other in this manner, it becomes possible to provide a overlapping part with the P phase bus bar 7 connected to the positive electrode terminal 5b and the N phase bus bar 8 connected to the negative electrode terminal 6a, and to make both bus bars face each other making the space between them a small distance. Here, along with making the insulating distance between each bus bar small, it is arranged to interpose the insulator 10 between them.

Next, another embodiment of the present invention will be explained in FIG. 7.

Figure 7:
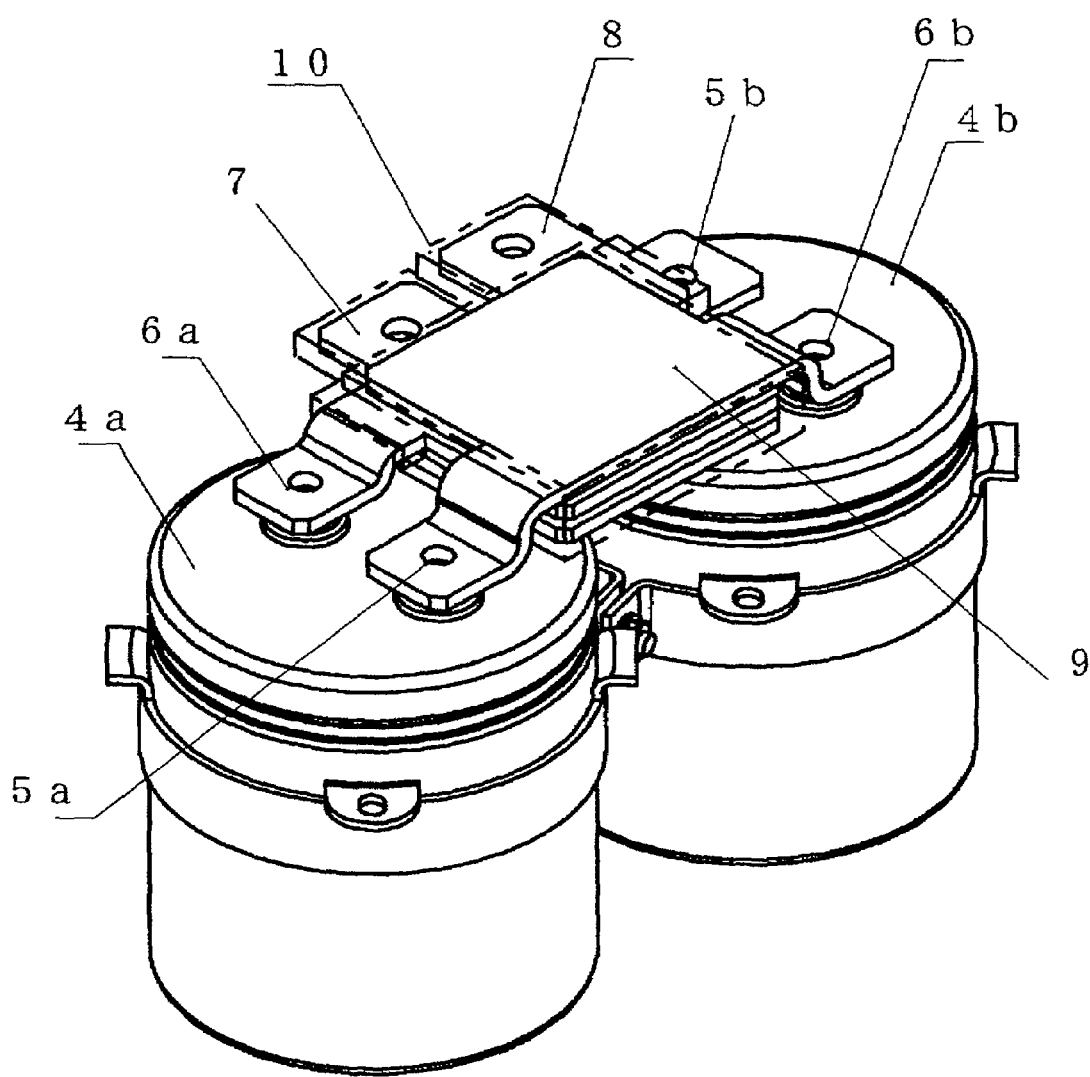
FIG. 7 is still another embodiment of the present invention.

In the embodiment shown in FIG. 2, the overlapping part is provided with the P phase bus bar 7 and the N phase bus bar 8, but in FIG. 7, it is devised further that the M phase bus bar 9 is also provided with an overlapping part which overlaps with the P phase bus bar 7 and the N phase bus bar 8. Thereby, it is aimed to reduce the inductance more than in FIG. 2.

As shown in FIG. 7, the smoothing capacitors 4a, 4b are provided with the positive electrode terminals 5a, 5b and the negative electrode terminals 6a, 6b. To the positive electrode terminals 5a, 5b, the P phase bus bar 7 is connected, and to the negative electrode terminals 6a, 6b, the N phase bus bar 8 is connected. And to the positive electrode terminal 5a of the smoothing capacitor 4a and the negative electrode terminal 6b of the smoothing capacitor 4b, the M phase bus bar 9 is connected. Here, between the P phase bus bar 7 or the N phase bus bar 8 and the M phase bus bar 9, the insulator 10 is provided.

To connect the smoothing capacitors 4a, 4b in series, using the M phase bus bar 9, one end of it is connected to the positive electrode terminal 5a of the smoothing capacitor 4a and the other end of it is connected to the negative electrode terminal 6b of the other smoothing capacitor 4b. And further, the forms of the wiring planar conductor of the bus bar connecting the converter part 1 and the inverter part 3 and the N phase bus bar 8 are enlarged respectively.

And the form of the wiring planar conductor of the M phase bus bar 9 is enlarged similar to the P phase bus bar 7 and the N phase bus bar 8, and the M phase bus bar 9 is overlapped on the P phase bus bar 7 and the N phase bus bar 8. And, each of them is arranged so that the overlapping area of each other becomes larger, further each of them is made to face in the space of close distance. For this purpose, the insulator 10 is interposed between each of the bus bars to minimize the insulating distance.

Figure 5:
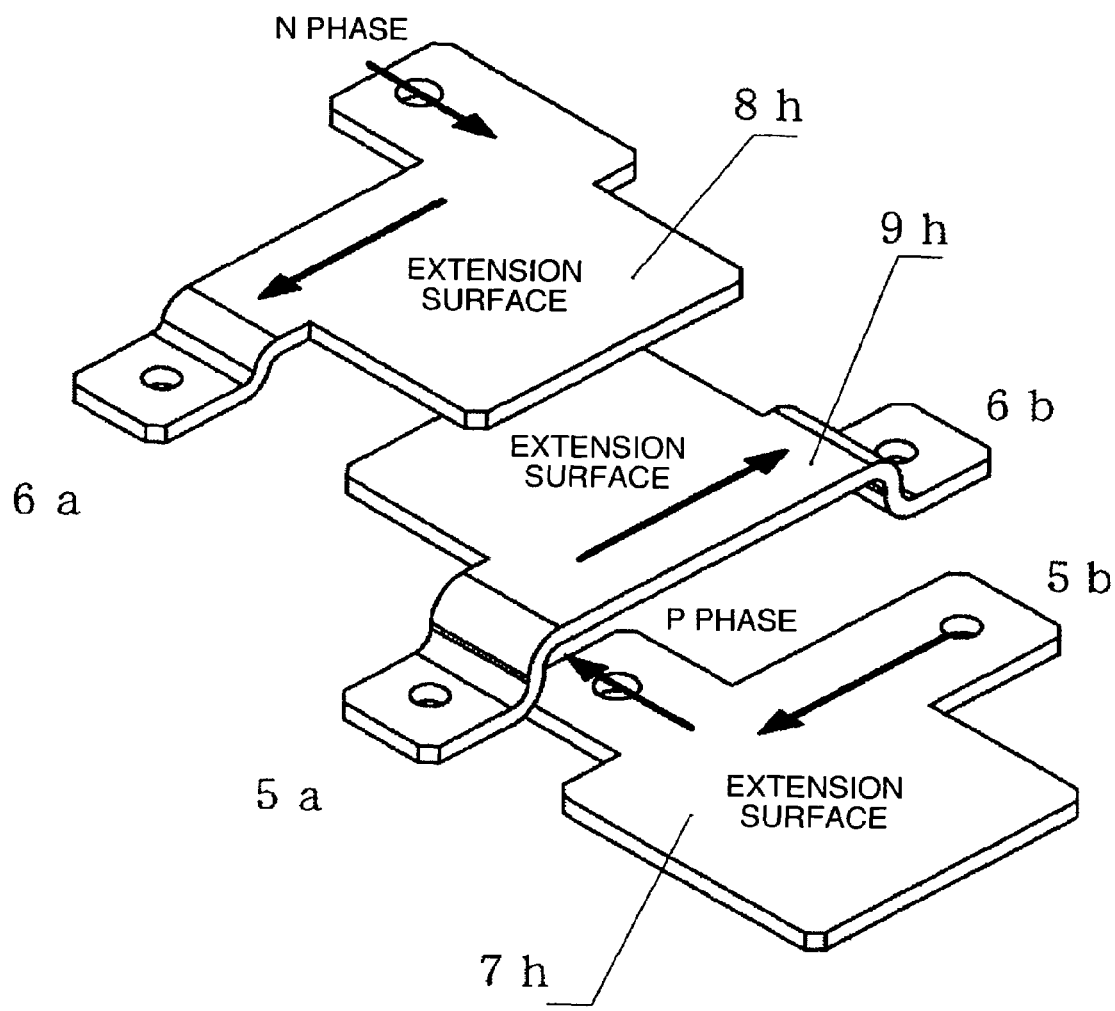
FIG. 5 is another embodiment of the present invention.
Figure 6:
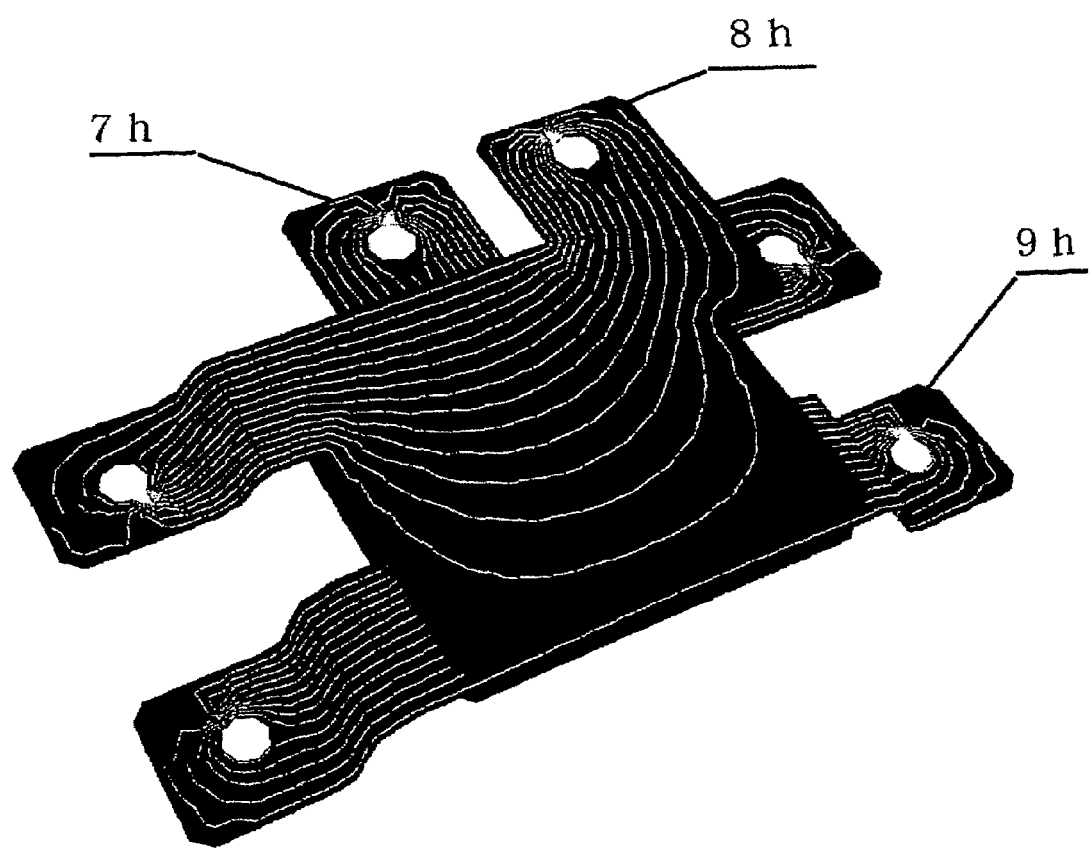
FIG. 6 is a result of the simulation of another embodiment of the present invention.

In FIGS. 5 and 6, the arrangement, the form, and the current streamline of a result of the simulation of each wiring planar conductor are shown.

As shown in FIG. 5, the M phase bus bar 9h is provided with an extension surface which is extended bulging on a plane to overlap the P phase bus bar 7h and the N phase bus bar 8h, in addition to the form to connect the positive electrode terminal 5a and the negative electrode terminal 6b in the shortest distance.

Further, each of the P phase bus bar 7h and the N phase bus bar 8h is provided with an extension surface which is extended bulging to overlap each other with two other bus bars.

In the simulation of FIG. 6, it is shown that in the current streamline of the N phase bus bar 8h, in addition to the flow of the current which connects the positive electrode terminal 6a and the negative electrode terminal connected to the inverter part in the shortest distance, the current which flows also facing the M phase bus bar 9h flows on the extension surface.

In the simulation of this time, the flow of the current which flows expanding as though to make a detour on the extension surfaces provided on the three bus bars of the P phase bus bar 7h, the N phase bus bar 8h, and the M phase bus bar 9h has been confirmed. This was a result against the anticipation that the current would flow the shortest current path for between the two terminals of the starting terminal and the ending terminal when the current flows. However, the proof was obtained to be able to reduce the inductance for each other by providing the above-mentioned extension surfaces utilizing this result.

Also in FIG. 5, for the M phase bus bar 9h the P phase bus bar 7h and the N phase bus bar 8h are provided above and below to interpose it between them, further the directions of the currents are made to be opposite to each other including the extension surfaces to be able to reduce the inductance. More specifically, as shown in FIG. 5, for the M phase bus bar 9h, the P phase bus bar 7h has the current which flows in the opposite direction to each other. Similarly, for the M phase bus bar 9h, the N phase bus bar 8h has the current which flows in the opposite direction to each other.

However, the above-mentioned order of each bus bar is not limited to the above description but the order may be varied appropriately according to the mounting state. Here, it is assumed the case where all the directions of the currents are not opposite to each other unlike FIG. 5, but it can be said that it is preferable to reduce the inductance if the currents of at least one set of the bus bars flow in the opposite directions to each other.

The distance of these bus bars overlapping each other is more effective when it is particularly smaller and closer distance, but when the insulating materials mentioned below are used in accordance with the standards of UL508C, EN61800-5, EN51870, etc. the thickness of the materials cannot be less than 0.71 mm (0.028 inch). In this case the insulating materials are Diallyl Phthalate, Epoxy, Melamine, Melamine-Phenolic, Phenolic, Unfilled Nylon, Unfilled Polycarbonate, Urea Formaldehyde, Cambric, Electric Grade Paper, RTV, Silicone, Treated Cloth, and Vulcanized Fiber.

Further, in the case where the insulating material is Aramid Paper, the thickness of the material cannot be less than 0.25 mm (0.010 inch).

Further, in the case where the insulating material is Mica, the thickness of the material cannot be less than 0.15 mm (0.006 inch).

Further, in the case where the insulating material is Mylar (PETP), the thickness of the material cannot be less than 0.18 mm (0.007 inch).

Further, in the case where a material other than these is used, it can be used when the thickness of the material is no less than 0.71 mm (0.028 inch), and further the resisting voltage test of 5000VAC is performed and it is decided that it has a resisting voltage, and further there are more than standard Relative Thermal Index (RTI), Hot Wire Ignition (HWI), Hight-Current Arc Resistance to Ignition (HAI), and Comparative Tracking Index (CTI).

Therefore, in the case where the bus bar is integrally molded with the insulator, for example by insert molding and modularizing the bus bar, etc., to satisfy these standards and create the form by the injection molding the thickness of the insulator needs to be about 2-3 mm.

Still further, also in the case where the insulator in the form of sheet is used, considering the tolerance on manufacturing the bus bar, it is common that the distance between each bus bar would be about 1-3 mm even though the thickness of the sheet of the insulator can be thinner.

However, with the distance of this level empirically there is no problem and the effect can be obtained.

Figure 8:
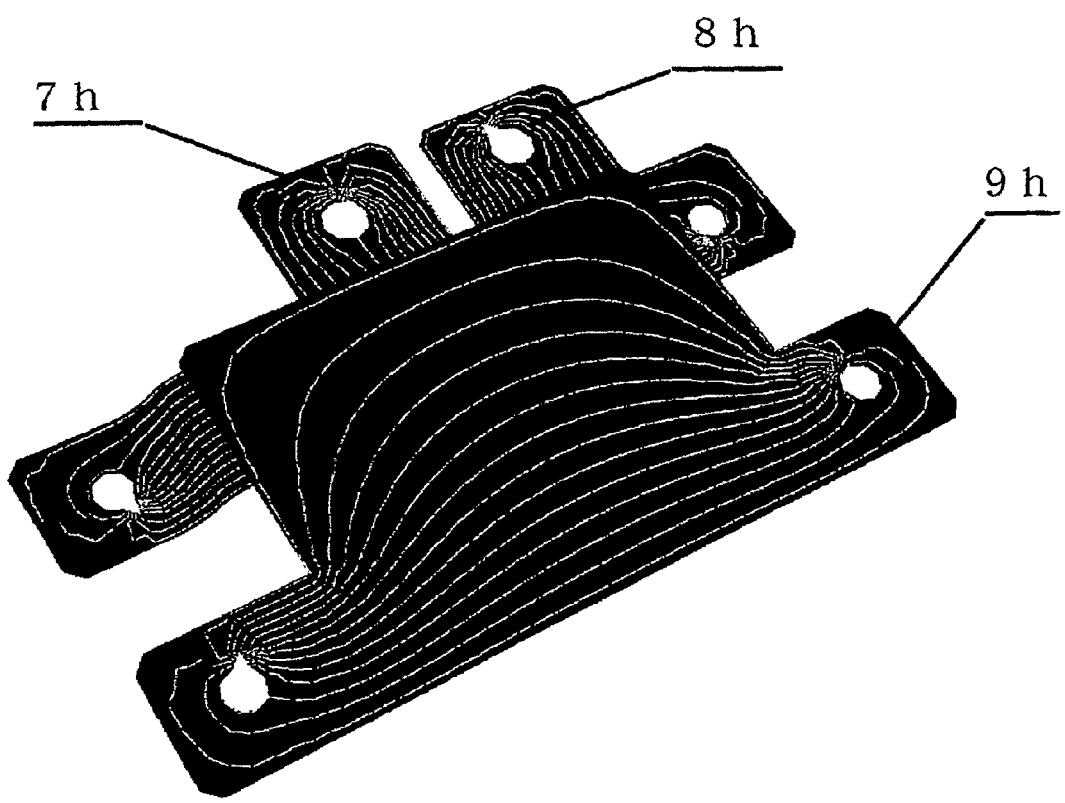
FIG. 8 is a result of the simulation of the embodiment of the present invention.

Further, a result of the simulation of still another embodiment is shown in FIG. 8. It can be confirmed that the current streamlines on each bus bar are along with the flows of the currents of the other phases.

Here, the difference between the results of the simulation of FIG. 6 and FIG. 8 is that FIG. 6 shows the case where the bus bar of the M phase is provided between the P phase and the N phase, and FIG. 8 shows the case where the bus bar of the M phase is provided on the P phase and the N phase. From these results it is understood that even when the bus bar of the M phase is arranged between the P phase and the N phase or on the P phase and the N phase, as each of them has the overlapping area each other, when they are arranged to face in the space of close distance, about the same effect can be obtained regarding the reduction of the inductance.

Also in FIG. 6 and FIG. 7, the part which is connected to the P phase on the positive electrode side of the inverter part and the part which is connected to the N phase on the negative electrode side of the inverter part are provided in the location which is directing towards the top part of the figure, but it is not limited to this location and it can be changed appropriately. For example, the part which is connected to the P phase on the positive electrode side of the inverter part or the part which is connected to the N phase on the negative electrode side of the inverter part may be provided in the location nearing the bottom part opposite to the top part of the figures of FIG. 6, FIG. 7. It is not shown in the figure, but it has been confirmed by the simulation that the inductance is reduced with such configuration.

According to the above-mentioned embodiments based on the present invention, as it is possible to restrain the surge voltage which is generated on turning off the device of the inverter part, it is possible to provide an apparatus with smaller size than the conventional one and to provide a good quality product by simplifying and downsizing the snubber circuit of the frequency converter and reducing the generation of heat of the inverter part.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power converter device comprising:
   a converter part which converts a power from a power source to a DC power;
   a smoothing part which smoothes an output from the converter part where a first capacitor part and a second capacitor part are connected in series; and
   an inverter part which converts an output of the smoothing part to an AC power and outputs it;
   wherein four electrode terminals of the first capacitor part and the second capacitor part are arranged to make a square on a plane;
   next to a positive electrode terminal of the first capacitor part a negative electrode terminal of the second capacitor part is arranged;
   next to a negative electrode terminal of the first capacitor part a positive electrode terminal of the second capacitor part is arranged; and
   a first wiring planar conductor which connects the positive electrode terminal of the first capacitor part and a P phase on a positive electrode side of the inverter part;
   a second wiring planar conductor which connects the negative electrode terminal of the second capacitor part and an N phase on a negative electrode side of the inverter part, said second wiring planar conductor being arranged so as to mutually overlap with said first wiring planar conductor; and
   a third wiring planar conductor which connects the negative electrode terminal of the first capacitor part and the positive electrode terminal of the second capacitor part, said third wiring planar conductor being arranged so as to mutually overlap with said first wiring planar conductor and said second wiring planar conductor are provided;
   wherein a direction of a current which flows in said third wiring planar conductor flows in a direction opposite to a direction of a current which flows in said first wiring planar conductor or said second wiring planar conductor.

2. The power converter device according to claim 1, wherein:
   said third wiring planar conductor is interpose between said first wiring planar conductor and said second wiring planar conductor, and a direction of a current which flows in said third wiring planar conductor is opposite to direction of currents which flows in said first wiring planar conductor.

3. The power converter device according to claim 2, wherein:
   insulators are interposed between said first wiring planar conductor and said third wiring planar conductor and between sad third wiring planar conductor and said second wiring planar conductor, respectively.

4. The power converter device according to claim 1, wherein:
   the form of said first wiring planar conductor has a shape including a building extension surface which is extended from a connection line position which connects the positive electrode terminal of the first capacitor part and the negative electrode terminal of the second capacitor part to the vicinity of a connection line which connects the negative electrode terminal of the first capacitor part to the positive electrode terminal of the second capacitor part;
   the form of the second wiring planar conductor has a shape including a building extension surface which is extended from a connection line position which connects the positive electrode terminal of the first capacitor part and the negative electrode terminal of the second capacitor part to the vicinity of a connection line which connects the negative electrode terminal of the first capacitor part to the positive electrode terminal of the second capacitor part; and
   the form of the second wiring planar conductor has a shape including a building extension surface which is extended from a connection line position which connects the negative electrode terminal of the first capacitor part and the positive electrode terminal of the second capacitor part to the vicinity of a connection line which connects the positive electrode terminal of the first capacitor part to the negative electrode terminal of the second capacitor part.

5. The power converter device according to claim 4, wherein:
   insulators are interposed between said first wiring planar conductor and said third wiring planar conductor and between sad third wiring planar conductor and said second wiring planar conductor, respectively.

6. A power converter device comprising:
   a converter part which converts a power from a power source to a DC power;
   a smoothing part which smoothes an output from the converter part where a first capacitor part and a second capacitor part are connected in series; and
   an inverter part which converts an output of the smoothing part to an AC power and outputs it;
   a wiring planar conductor surface of a first wiring planar conductor which connects a P phase of a positive electrode side of said inverter part and a positive electrode of said capacitor part;
   a second wiring planar conductor which connects a negative electrode of said second capacitor part and a N phase on a negative electrode side of said inverter part and is arranged so as to mutually overlap with said first wiring planar conductor; and
   a third wiring planar conductor which is interposed between said first and second wiring planar conductors so as to mutually overlap with said first and second wiring planar conductors and connects a negative electrode of said first capacitor part and a positive electrode of said second capacitor part;
   wherein a direction of a current which flows in said third wiring planar conductor flows in a direction opposite to a direction of a current which flows in said first wiring planar conductor or said second wiring planar conductor.

7. The power converter device according to claim 6, wherein:
   each of said first, second and third wiring planar conductors has a shape including a building extension surface.

8. The power converter device according to claim 7, wherein:
   insulators are interposed between said first wiring planar conductor and said third wiring planar conductor and between sad third wiring planar conductor and said second wiring planar conductor, respectively.

9. The power converter device according to claim 7, wherein:
   said building extension surface of said first, second and third wiring planar conductors are arranges so as to mutually overlap with each other.

10. The power converter device according to claim 9, wherein:
    insulators are interposed between said first wiring planar conductor and said third wiring planar conductor and between sad third wiring planar conductor and said second wiring planar conductor, respectively.

* * * * *

UNITED STATES PATENT AND TRADEMARK OFFICE
CERTIFICATE OF CORRECTION

PATENT NO. : 7,518,890 B2 Page 1 of 1
APPLICATION NO. : 11/508198
DATED : April 14, 2009
INVENTOR(S) : Hirota et al.

It is certified that error appears in the above-identified patent and that said Letters Patent is hereby corrected as shown below:

On the Title page, item [73] should read

--Assignee: Hitachi Industrial Equipment Systems Co., Ltd., Tokyo (JP)--.

Signed and Sealed this

Sixteenth Day of February, 2010

David J. Kappos
*Director of the United States Patent and Trademark Office*